United States Patent
Seo et al.

(10) Patent No.: US 9,445,175 B2
(45) Date of Patent: Sep. 13, 2016

(54) BLUETOOTH HEADSET

(71) Applicant: LG ELECTRONICS INC., Seoul (KR)

(72) Inventors: Sangwoo Seo, Seoul (KR); Hyunsun Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 200 days.

(21) Appl. No.: 13/933,951

(22) Filed: Jul. 2, 2013

(65) Prior Publication Data
US 2014/0233752 A1    Aug. 21, 2014

(30) Foreign Application Priority Data

Feb. 21, 2013 (KR) .................. 10-2013-0018681

(51) Int. Cl.
| | | |
|---|---|---|
| *H04R 1/10* | (2006.01) | |
| *H04M 1/03* | (2006.01) | |
| *H04M 1/05* | (2006.01) | |
| *H04M 1/60* | (2006.01) | |
| *H04R 5/033* | (2006.01) | |

(52) U.S. Cl.
CPC ............ *H04R 1/10* (2013.01); *H04M 1/035* (2013.01); *H04M 1/05* (2013.01); *H04M 1/6066* (2013.01); *H04R 5/033* (2013.01); *H04M 2250/02* (2013.01); *H04M 2250/04* (2013.01); *H04M 2250/12* (2013.01); *H04R 2420/07* (2013.01)

(58) Field of Classification Search
CPC .... H04R 1/10; H04R 5/033; H04R 2420/07; H04R 5/003; H04R 5/04; H04R 1/1041; H04R 1/1016; H04M 1/6066; H04M 1/035; H04M 1/05; H04M 2250/04; H04M 2250/02; H04M 2250/12

USPC ............. 381/74; 370/329, 252; 455/41.2; 174/261
See application file for complete search history.

(56) References Cited

U.S. PATENT DOCUMENTS

| | | | |
|---|---|---|---|
| 6,013,007 A * | 1/2000 | Root .................. | A63B 24/0006 482/8 |
| 7,076,277 B2 | 7/2006 | Kim et al. | |
| 7,428,429 B2 | 9/2008 | Gantz et al. | |
| 2005/0135644 A1* | 6/2005 | Qi .......................... | H04R 25/43 381/314 |
| 2007/0003096 A1* | 1/2007 | Nam .................... | H04R 1/1091 381/382 |

(Continued)

FOREIGN PATENT DOCUMENTS

| | | |
|---|---|---|
| DE | 203 19 012 U1 | 5/2005 |
| JP | 2007-519342 A | 7/2007 |

(Continued)

*Primary Examiner* — Simon Sing
(74) *Attorney, Agent, or Firm* — Birch, Stewart, Kolasch & Birch, LLP (57) ABSTRACT

A wireless headset including a body having an earphone coupling portion; a wireless module provided in the body and configured to wirelessly receive an audio signal from a mobile terminal; a speaker provided in the body; an earphone connected to the body via a cable and configured to be coupled to the body via an earphone coupling portion; a coupling sensor provided the body and configured to sense whether the earphone is coupled to the earphone coupling portion; and a controller configured to output the audio signal received from the mobile terminal via the speaker and not via the earphone, when the coupling sensor senses the earphone is coupled to the earphone coupling portion, and output the audio signal received from the mobile terminal via the earphone and not via the speaker, when the coupling sensor senses the earphone is separated from the earphone coupling portion.

20 Claims, 8 Drawing Sheets

(56) References Cited

U.S. PATENT DOCUMENTS

| | | |
|---|---|---|
| 2007/0160245 A1 | 7/2007 | Peng |
| 2008/0129470 A1* | 6/2008 | Croft .................. H04R 1/406 340/384.6 |
| 2009/0182913 A1* | 7/2009 | Rosenblatt et al. ............ 710/72 |
| 2009/0274317 A1* | 11/2009 | Kahn .................. H04M 1/6066 381/74 |
| 2010/0020982 A1* | 1/2010 | Brown .................. H03G 3/20 381/74 |
| 2010/0041447 A1* | 2/2010 | Graylin .................. H04M 1/05 455/575.2 |
| 2013/0066636 A1* | 3/2013 | Singhal .................. H04R 1/32 704/275 |
| 2013/0331153 A1* | 12/2013 | Krimstock .......... H04M 1/6041 455/569.1 |
| 2014/0205108 A1* | 7/2014 | Triato .................. H04R 5/0335 381/74 |

FOREIGN PATENT DOCUMENTS

| | | |
|---|---|---|
| KR | 20-0223427 | 4/2001 |
| KR | 10-0501189 B2 | 7/2005 |
| KR | 10-2005-0096301 A | 10/2005 |
| KR | 10-0677583 B1 | 2/2007 |
| WO | WO 2009/134940 A1 | 11/2009 |

* cited by examiner

BLUETOOTH HEADSET

Pursuant to 35 U.S.C. §119(a), this application claims the benefit of earlier filing date and right of priority to Korean Application No. 10-2013-0018681, filed on Feb. 21, 2013, the contents of which are hereby incorporated by reference herein in their entirety.

BACKGROUND OF THE INVENTION

1. Field of the Invention

The present invention relates to a wireless headset that is useable as an earphone and as a speaker.

2. Discussion of the Related Art

As a multimedia device is mounted in a mobile terminal for main functions, various contents can be provided to a user via a mobile terminal. Examples of such a multimedia device include a broadcasting phone and Portable Media Player (PMP) phone. BLUETOOTH™ headsets (in other words, wireless headsets) are also in high demand.

In more detail, BLUETOOTH is the standard for implementing wireless communication between wireless communication devices in a short range with a low energy and it processes information transmission among computers, mobile phones, headsets, personal digital assistants (PDAs), personal computers (PCs) and printers.

Typically, BLUETOOTH is the telecommunications technology that can transmit and receive data in a range between ten meters to hundreds of meters as the maximum limit wirelessly. The data transmission rate of BLUETOOTH is 433.9 kbps in a symmetric communication mode and 723.2 kbps in a non-symmetric communication mode. A synchronous transmission system of 64 kbps is used when transmitting voice. Further, BLUETOOTH processes wireless access of a wireless headset, a wireless keyboard, PDA, a notebook, a camera and a mobile terminal to a peripheral device and a query facility via mobile communication.

A related art BLUETOOTH headset is always inserted in a user's ear when being used. If the use fails to sense a danger nearby while walking or if the user uses an earphone type BLUETOOTH headset constantly, there is a disadvantage of an adverse effect on the user's hearing.

SUMMARY OF THE INVENTION

Accordingly, one object of the present invention is to provide a BLUETOOTH headset that includes an earphone and a speaker to allow a user to hear sounds via the earphone or speaker according to different situations.

To achieve these objects and other advantages and in accordance with the purpose of the invention, as embodied and broadly described herein, a BLUETOOTH headset includes a body that is wearable by a user, having an earphone coupling portion formed therein; a BLUETOOTH module provided in the body to receive an audio signal from a mobile terminal wirelessly; a speaker provided in the body; an earphone connected to the body via a cable, with an unit separable from the earphone coupling portion to be coupled to the user's ear; a coupling sensor provided in each of ends of the body to sense whether the earphone is coupled to the earphone coupling portion; and a controller configured to control a sound corresponding to the audio signal to be output via the speaker, when the earphone is coupled to the earphone coupling portion, and to control the sound corresponding to the audio signal to be output via the earphone, when the earphone is separated from the earphone coupling portion.

The speaker may include an audio hole and the audio hole may be formed adjacent to the user's ear when the user wears the body.

The speaker may further include a waveguide provided in the audio hole and the waveguide may be formed in a taper shape having a cross section getting larger toward the audio hole.

A projection having a curved surface may be formed in an inner surface of the waveguide.

The body may include a C-shaped neckband that is wearable on the user's neck and the audio hole may be formed upward when the user wears the neckband around the user's neck.

The audio hole may include a first audio hole that is open upward, when the user wears the neckband around the user's neck, to position one end in the right and the other end of the neckband in the left; a second audio hole that is open upward, when the user wears the neckband around the user's neck, to position one end in the left and the other end of the neckband in the right; and covers configured to open and close the first audio hole and the second audio hole, respectively, and the controller may control the covers to open one of the audio holes positioned higher and to close the other audio hole positioned lower.

The BLUETOOTH headset may further include a gyroscope configured to sense a direction of the neckband, wherein the controller may open and close the covers based on the direction sensed by the gyroscope.

The speaker may be rotatable and the controller may rotate the speaker to position the audio hole higher based on the direction in which the user worn the neck band.

The BLUETOOTH headset may further include a microphone formed in one end of the neckband, wherein the speaker may be formed in other end of the neckband.

The BLUETOOTH headset may further include a microphone formed in one end of the neckband, wherein the speaker may be formed in each of ends provided in the neckband and only one speaker positioned in the other end of the neckband is operated when a sound is input via the microphone.

A pair of earphone coupling portions may be formed in both ends of the body, respectively and a pair of earphones may be coupled to the pair of the earphone coupling portions, respectively.

The controller may output sounds via the speaker, when one of the earphones is separated from the earphone coupling portion and the other one is not separated in a preset time period.

The controller may transmit a control signal to the mobile terminal to activate a call function of the mobile terminal, when one of the earphones is separated and the other one is not separated in a preset time period.

The controller may transmit a control signal to the mobile terminal to activate a music playing function of the mobile terminal, when both of the earphones are separated from the earphone coupling portions.

The BLUETOOTH headset may further include a button provided in right and left portions of the body symmetrically to transmit a control signal to the mobile terminal via BLUETOOTH to activate a specific function of the mobile terminal; and a gyroscope configured to distinguish an upper portion from a lower position of the body, wherein the controller switches over functions of the left and right buttons, when the gyroscope senses that upper and lower position of the body is switched over.

The earphone further comprises a temperature sensor and the controller may output sounds via the earphone only when the temperature sensor senses a temperature higher than a reference temperature.

The body may further include a neckband wearable by the user around the user's neck; and a gyroscope configured to sense the position of the body. The unit of the earphone may further include a gyroscope configured to sense the position of the earphone unit and the controller may output sounds via the earphone, only when the position of the earphone is higher than the position of the body.

The body may further include a vibration motor and the vibration is operated when an alarm function is activated in the mobile terminal.

At least one of the earphone and the earphone coupling portion may include a magnet and the coupling and separation between the earphone and the earphone coupling portion is performed by a magnetic force.

The coupling sensor may sense the coupling between the earphone and the earphone coupling portion by using at least one of a hall IC, a static pressure sensor, a capacity sensor and a proximity sensor.

According to at least one of embodiments, both of the earphone and the speaker can be used in the BLUETOOTH headset such that a dangerous situation caused by earphone usage while the user is walking can be avoided.

Furthermore, the audio hole provided in the speaker may be positioned adjacent to the user's ear and an optimized sound can be provided via the speaker.

Still further, it is automatically switched that the sound is output via the speaker or the earphone, in case the user is not using the earphone obviously. Accordingly, user convenience can be enhanced.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DESCRIPTION OF EMBODIMENTS OF THE PRESENT INVENTION

Reference will now be made in detail to the preferred embodiments of the present invention, examples of which are illustrated in the accompanying drawings.

It will be understood that when an element is referred to as being 'on' or 'under' another element, it can be directly on/under the element, and one or more intervening elements may also be present. When an element is referred to as being 'on' or 'under', 'under the element' as well as 'on the element' can be included based on the element.

Figure 1:
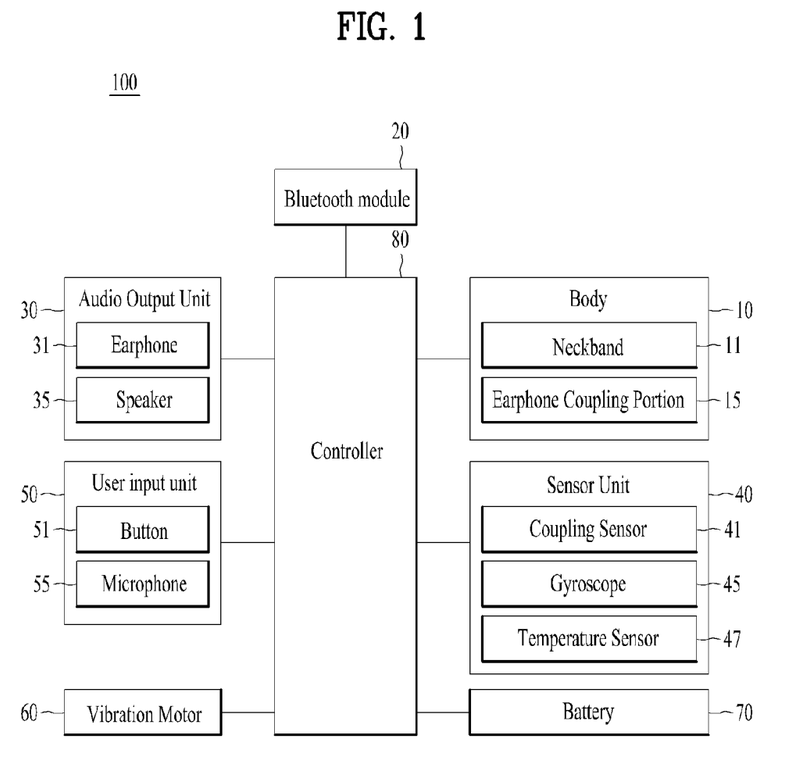
FIG. 1 is a block diagram of a BLUETOOTH headset according to one embodiment of the present invention.
Figure 2:
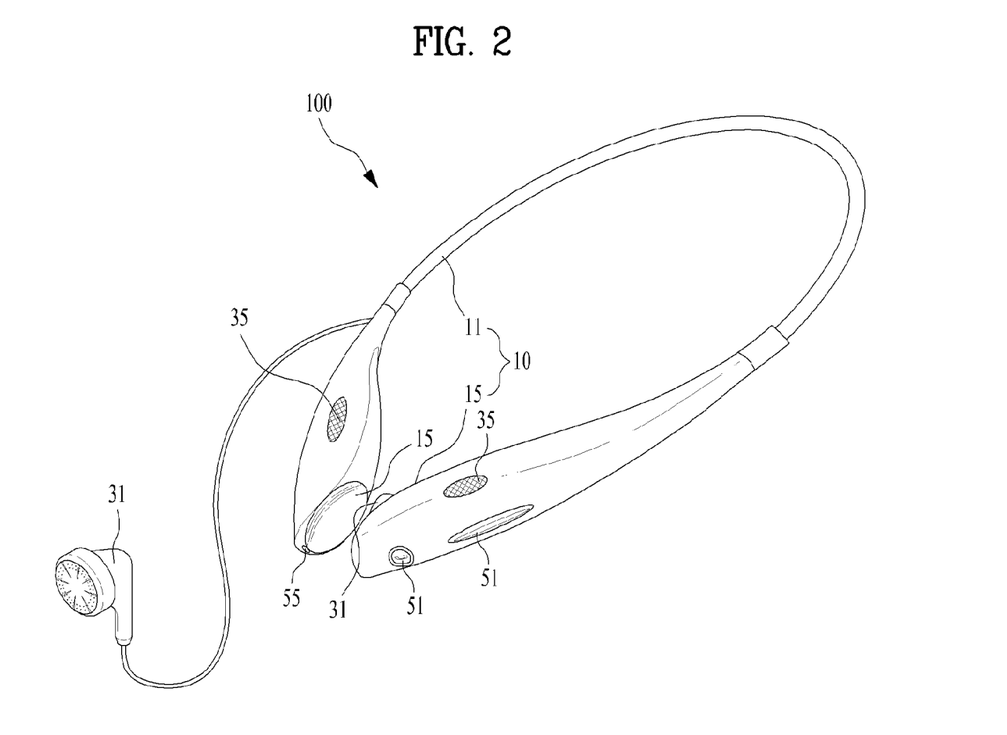
FIG. 2 is a perspective diagram of the BLUETOOTH headset according to one embodiment of the present invention.

FIG. 1 is a block diagram of a BLUETOOTH headset 100 according to one embodiment of the present invention, and FIG. 2 is a perspective diagram of the BLUETOOTH headset 100 according to one embodiment of the present invention.

As shown, the BLUETOOTH headset 100 includes a body 10, a BLUETOOTH module 20, an audio output unit 30 having an earphone 31 and a speaker 35, a sensor unit 40 having a coupling detecting sensor 41 and a gyroscope 45, a user input unit 50 having a microphone 55 and a button 51 (two buttons 51 are shown as an example in FIG. 2), a vibration motor 60, a battery 70 and a controller 80.

The body 10 is wearable on a user's body and includes an earphone coupling portion 15. Also, the body 10 can have a neckband 11 wearable on the user's neck. As shown in FIG. 2, the neckband 11 is a C-shaped material and includes the earphone coupling portion 15 formed in at least one of ends.

A unit configured to be inserted in the user's ear may be coupled to the earphone coupling portion 15. Here, the coupling may be the inserted coupling or at least one of the earphone 31 and the earphone coupling portion 15 may include a magnet to make the coupling enabled by a magnetic force.

The BLUETOOTH module 20 is the part for short range wireless communication with a mobile terminal and BLUETOOTH is a short range wireless technical standard. The BLUETOOTH is used when low energy wireless connectivity is required in a short range and signals are transmitted and received via wireless communication, such that signals can be exchanged in a predetermined distance, with no inconvenient cables.

Further, the BLUETOOTH uses 2400~2483.5 MHz that is ISM (Industrial Scientific and Medical) frequency band. The BLUETOOTH uses total 79 channels including 2 MHz after 2400 MHz, 2402~2480 MHz except a range to 3.5 MHz before 2483.5 MHz, to prevent interruption in other systems using higher and lower frequencies.

The BLUETOOTH system uses the same frequency band together with various systems and it is likely to cause radio frequency inference among systems. To prevent such radio frequency interference, the BLUETOOTH system adapts a frequency hopping method that transmits a packet (data) gradually, while moving many channels according to a predetermined pattern.

The BLUETOOTH module 20 is coupled to a mobile terminal to receive an audio signal from the mobile terminal and outputs sound via the audio output unit 30. The audio output unit 30 according to the embodiment may include the earphone 31 worn on the user's ear to enable the user to only hear sounds and the speaker 35 configured to output sounds, spaced apart a predetermined distance from the user's ear.

The earphone 31 is connected to the body 10 via a wire to receive the audio signal via the wire and outputs sounds. A unit is provided in an end of the wire to be inserted in the user's ear so as to output sounds and the unit is coupled to the earphone coupling portion 15 of the body 10.

The earphone 31 enables the user to only hear the sounds, without disturbing other people by noises, and prevents a third person from eavesdropping on a telephone conversation. However, the user may have trouble hearing outside sounds and thus the user might be in danger while walking or driving.

Thus, the BLUETOOTH headset 100 according to one embodiment of the present invention includes the speaker 35 rather than the earphone 31 such that the user can listen to the music or talk on the phone by selecting the earphone 31 or the speaker 35. As shown in FIG. 2, the speaker 35 may be provided in each of both ends possessed by the body or in one of the ends. When the speaker 35 is provided in only one end of the body, the speaker 35 is preferably provided in a location opposite to the microphone 55.

An audio hole 36 provided in the speaker 35 may be formed as close to the user's ear as possible to make the user hear the sounds with no loss of the sounds and to minimize the disturbance to the surroundings. As shown in FIG. 2, the audio hole 36 (see FIG. 6) formed in the body 10 including the C-shaped neckband 11 according to the BLUETOOTH headset 100 may be formed toward upside when the user wears the neckband 11.

Figure 3:
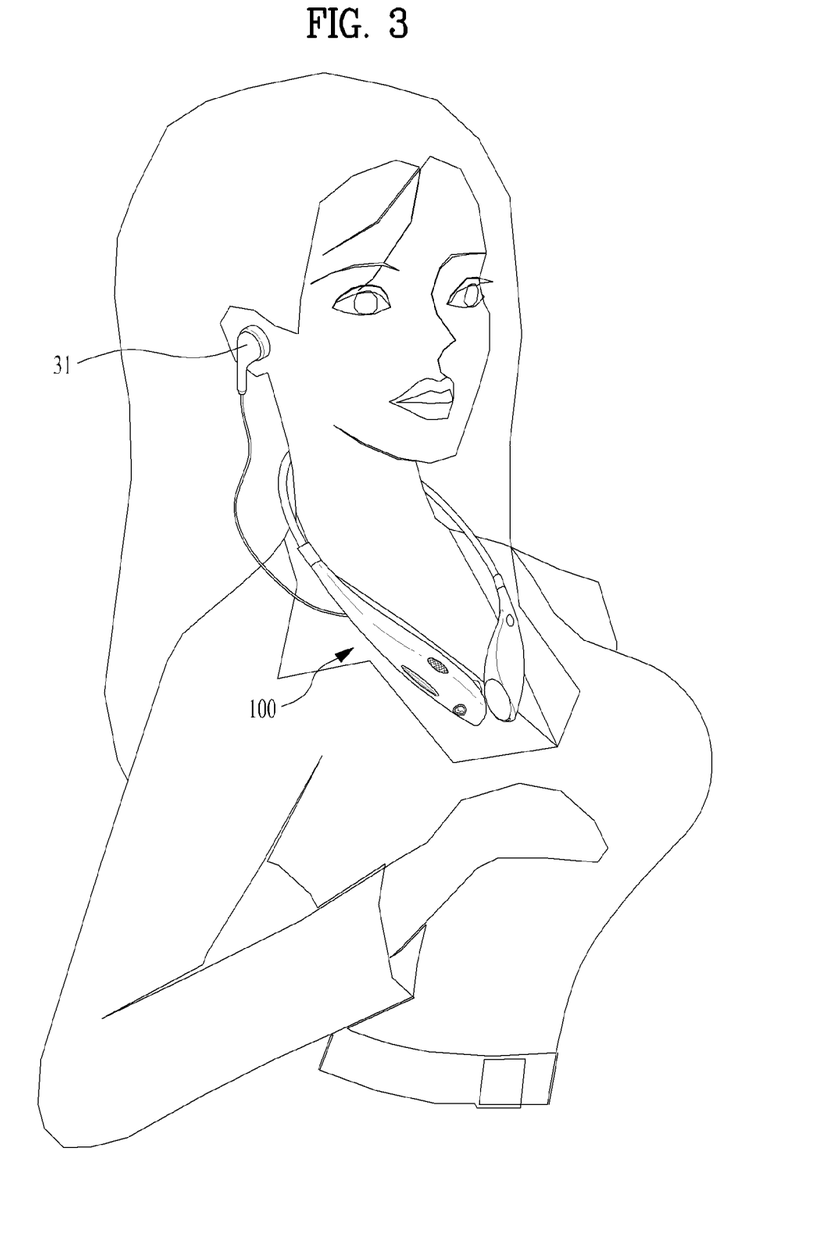
FIGS. 3 and 4 are diagrams illustrating a usage state of the BLUETOOTH headset.
Figure 4:
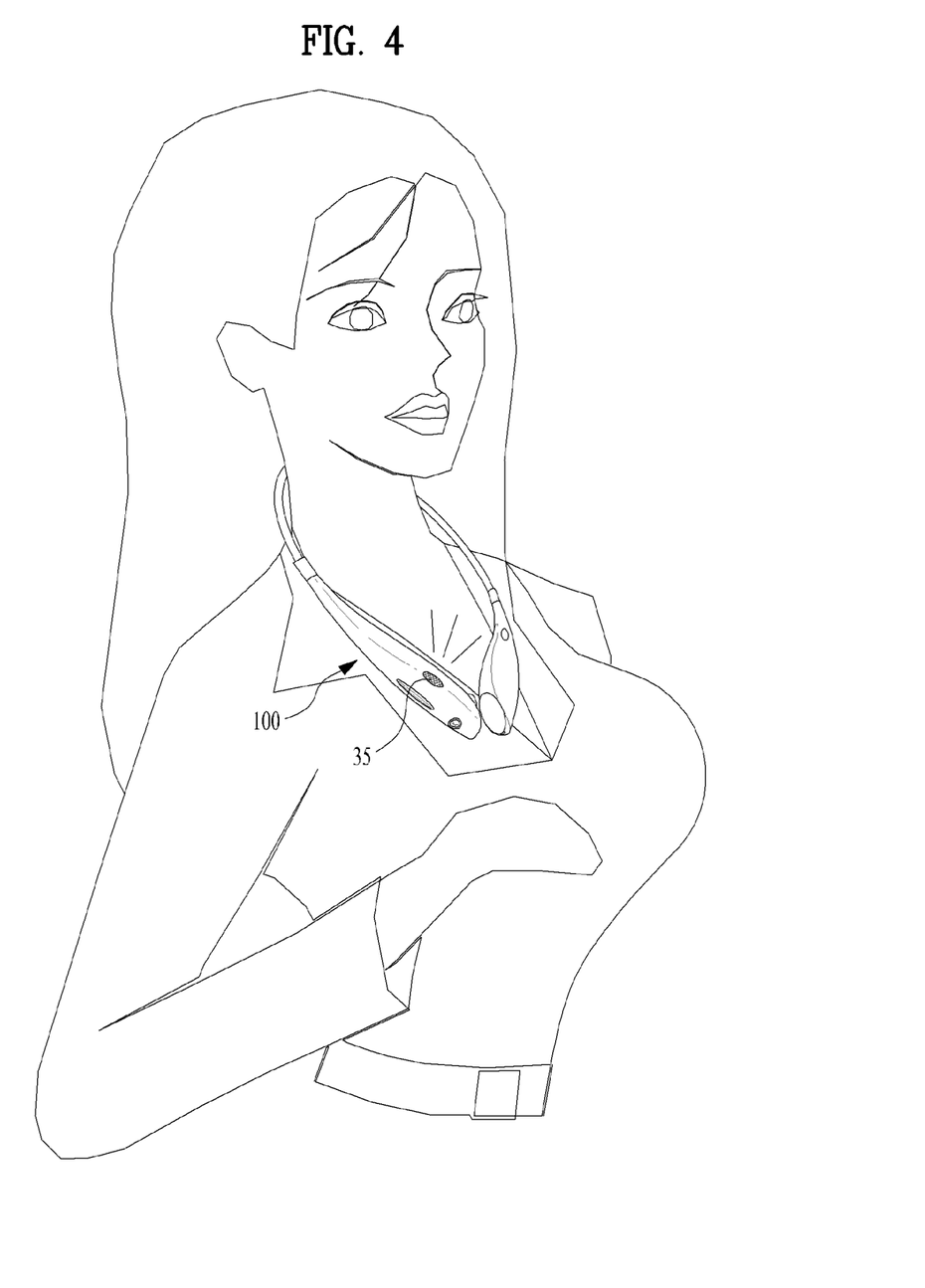

In addition, FIG. 3 shows the user wearing the headset 100 around their neck with the earphone 31 in their ear and sound being output via the earphone 31. FIG. 4 shows the user wearing the headset 100 without having the earphone 31 in their ear, and instead the sound is output via the speaker 35.

Figure 5:
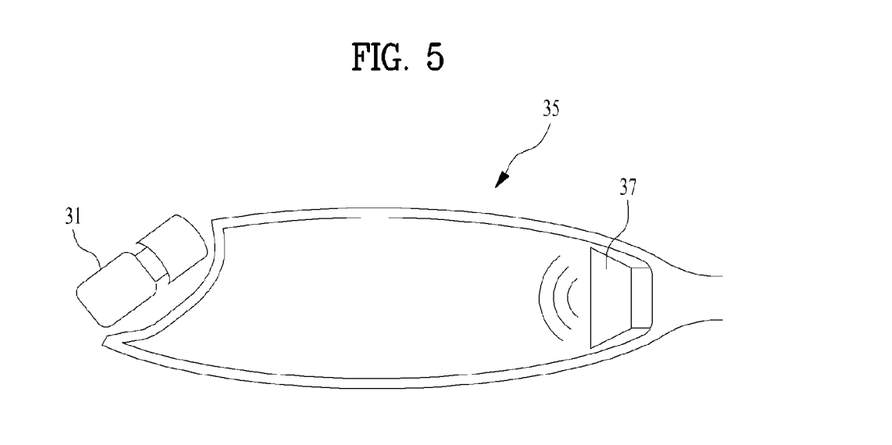
FIGS. 5 and 6 are sectional diagrams illustrating a speaker according to a first embodiment that is provided in the BLUETOOTH headset.
Figure 6:
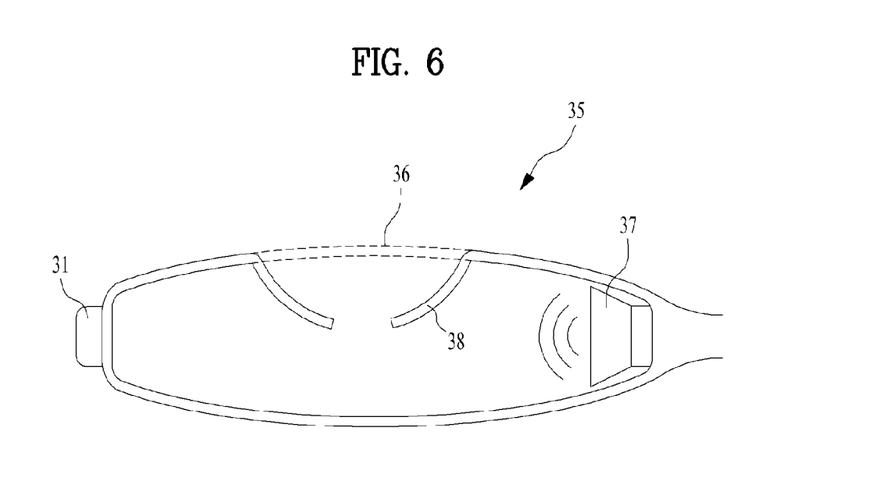

Next, FIG. 5 is a horizontal sectional diagram illustrating a first embodiment of the speaker 35 provided in the BLUETOOTH headset 100, and FIG. 6 is a longitudinal sectional diagram illustrating the first embodiment of the speaker 35 provided in the BLUETOOTH headset 100.

The audio hole 36 is formed upward and no hole is shown in the horizontal sectional diagram of FIG. 5. However, the audio hole 36 is shown in an upper portion provided in the longitudinal sectional diagram of FIG. 5. The audio hole 36 may include a mesh having a plurality of micro holes formed therein to prevent internal parts from being seen outside. An audio module 37 may be formed adjacent to the audio hole 36 or formed a certain distance from the audio hole 36, as shown in the drawings.

Further, the audio hole 36 may also include a waveguide 38 provided therein, with a taper shape having a cross section getting larger toward the audio hole 36. The waveguide 38 is a pipe-shaped material so that a sound wave or an electromagnetic wave can pass through. When the waveguide 38 is formed in the taper shape having the cross section getting larger toward the audio hole 36 as shown in FIG. 6, the sound can be amplified. FIG. 6 also shows only a conical waveguide 38 and the waveguide 38 may be longitudinally spiral-shaped to amplify the sound.

Figure 7:
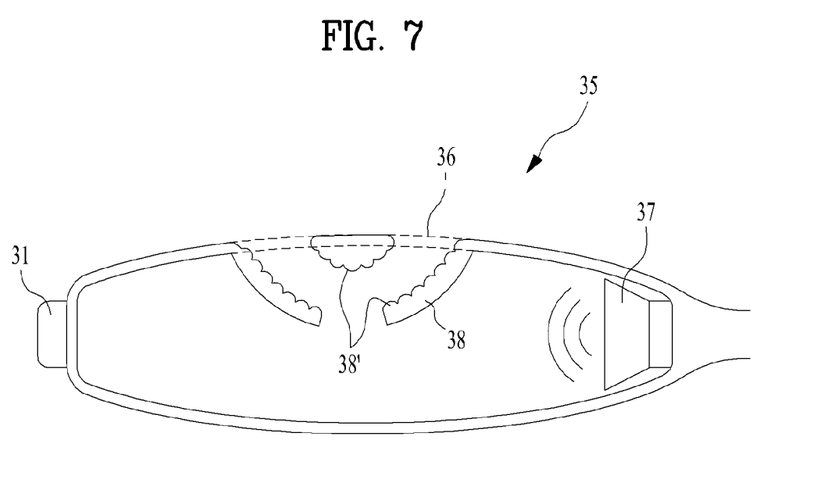
FIG. 7 is a sectional diagram illustrating a speaker according to a second embodiment that is provided in the BLUETOOTH headset.

As shown in FIG. 7, curved projections 38' can be formed in a wall surface of the waveguide 38. The projections 38' minimize sound distortion and reduce noises. As shown in FIG. 7, the waveguide 38 may also have two passages configured to output sounds there through, respectively.

Figure 8:
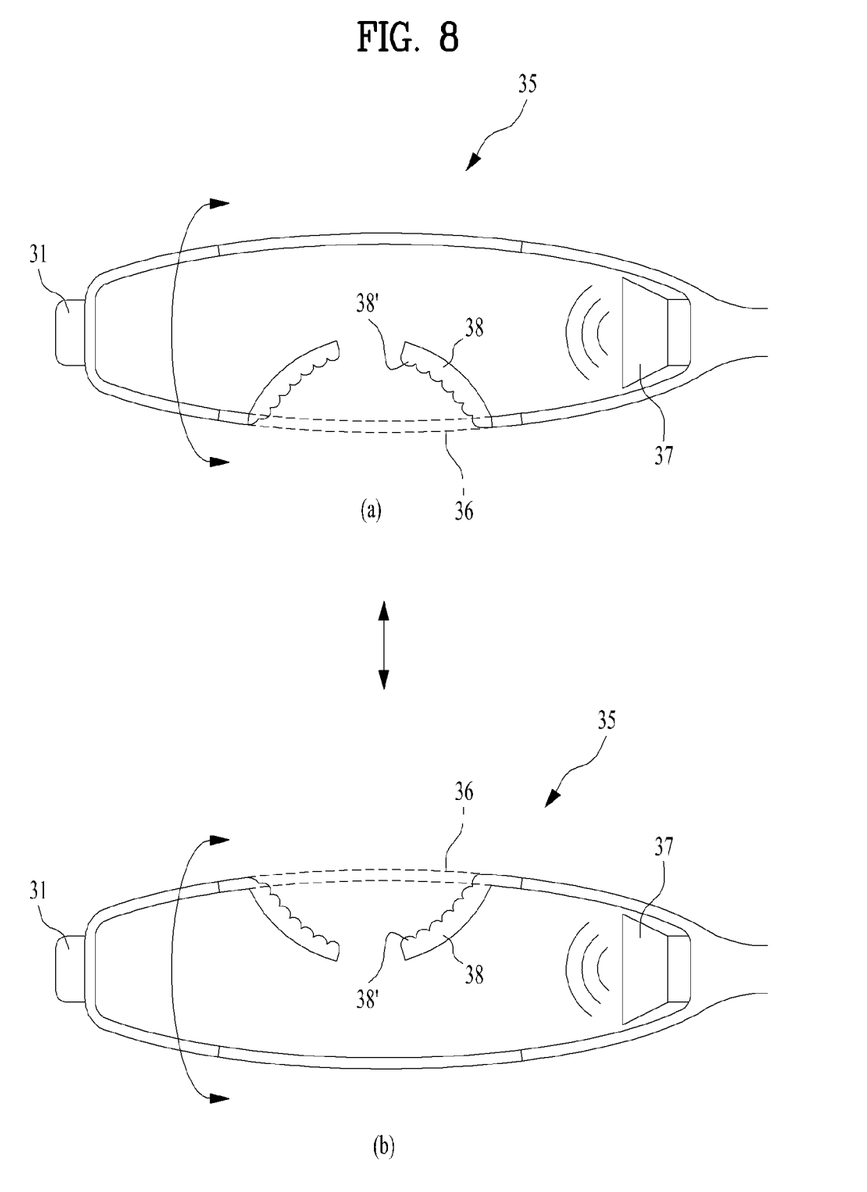
FIG. 8 is a sectional diagram illustrating a speaker according to a third embodiment that is provided in the BLUETOOTH headset.

Further, the audio hole 36 of the speaker 35 is preferably arranged adjacent to the user's ear. However, as shown in FIG. 8(a), the audio hole 36 may be formed downward, when right and left portions are reversed by the user's wearing the BLUETOOTH headset in the reverse. In this instance, the speaker 35 may be rotated to position the audio hole 36 upward again as shown in FIG. 8(b).

The rotation of the speaker 35 can be manually performed by the user. Alternatively, the gyroscope 45 can sense a state of the body 10 to determine whether to rotate the speaker 35 to position the audio hole 36 upward, when the audio hole 36 is pointing downward.

Figure 9:
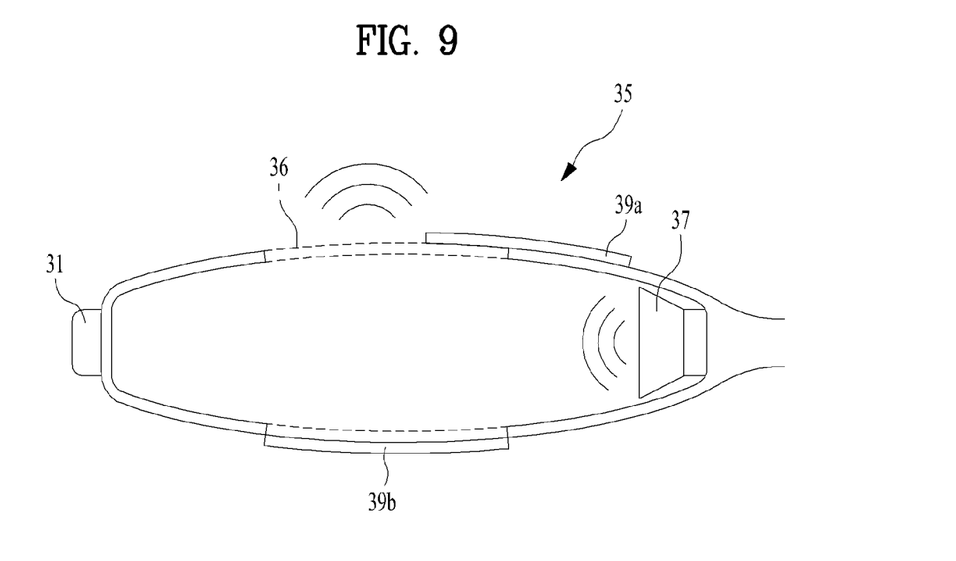
FIG. 9 is a sectional diagram illustrating a speaker according to a fourth embodiment that is provided in the BLUETOOTH headset.

Alternatively, as shown in FIG. 9, audio holes 36 may be formed in upper and lower portions, respectively, and covers 39a and 39b are provided in the audio holes 36, respectively. One cover can open the audio hole 36 positioned in the upper portion and close the other audio hole 36 positioned in the lower portion, such that the audio hole 36 may be controlled to always open upward, regardless of the direction in which the user wears the BLUETOOTH headset 100.

The sensor unit may also include the coupling sensor 41 and the gyroscope 45. The coupling sensor 41 senses whether the earphone 31 is coupled to the earphone coupling portion 15. At least one of a hall IC, a static pressure sensor, a capacity sensor, a magnetic sensor and a proximity sensor can be used as the coupling sensor 41.

The hall IC is configured to sense change in a magnetic field. When the earphone 31 is coupled to the earphone coupling portion 15 by a magnetic force, the hall IC is on. When the earphone 31 is separated from the earphone coupling portion 15, the hall IC is off. Accordingly, it can be sensed whether the earphone 31 is coupled to the earphone coupling portion 15 or not.

The static pressure sensor is configured to sense a pressure. When a predetermined portion of the earphone 31 or the earphone coupling portion 15 is pressured by the coupling between the earphone 31 and the earphone coupling portion 15, the static pressure sensor senses the pressure and determines whether the earphone 31 is coupled to the earphone coupling portion 15.

The capacity sensor is configured to sense change in the capacity of a capacitor. When the capacity of the capacity sensor changes, the capacity sensor determines that the earphone 31 is coupled to or separated from the earphone coupling portion 15.

The proximity sensor is configured to sense whether an object approaches based on an infrared ray returning after collided with the object from an infrared ray sensor. When the proximity sensor is provided in the earphone coupling portion 15, it is sensed that the earphone 31 is coupled to the earphone coupling portion 15.

In addition, as discussed above, FIG. 3 is a diagram illustrating a usage state where the sound is output via the earphone 31 of the BLUETOOTH headset 100, and FIG. 4 is a diagram illustrating a usage state where the sound is output via the speaker 35 of the BLUETOOTH headset 100. These figures show an ON/OFF of the speaker 35 when the earphone 31 is coupled to the earphone coupling portion 15.

In more detail, when the earphone 31 is separated from the earphone coupling portion 15 as shown in FIG. 3, sounds are output via the earphone 31. When the earphone 31 is coupled to the earphone coupling portion 15 as shown in FIG. 4, it is determined that the user does not use the earphone 31 anymore and sounds are output via the speaker 35.

In addition, when the coupling sensor 41 senses that the earphone 31 is separated from the earphone coupling portion 15, the controller 80 may generate a control signal. For example, when one side of the earphone 31 is separated, a call function may be activated. When both ends of the earphone 31 are separated, a music play function may be activated. When the earphone 31 is coupled, the corresponding function is implemented in a speaker mode and sounds may be controlled to output via the speaker 35, without ending the music play function or the call function.

When the separation is not performed for the pair of the earphones in a predetermined time period (for example, in several seconds), it can be determined that one of the earphones escapes while the user is moving, not separated intentionally to use the earphones 31. When the other one is not separated in a predetermined time period, with only one of the earphones 31 being separated from the earphone coupling portion 41, the sounds may be controlled to output via the speaker continuously, without switching the mode into the earphone mode 31.

The gyroscope 45 is configured to read angle change generated in up/down, right/left and back/forth directions so as to notify the velocity and location of a movable object. After a micro vibration structure is fabricated on a silicon wafer, the gyroscope senses angular displacement generated by rotation in a state of driving the vibration structure. Such the gyroscope 45 may be provided in the body 10 to determine a state of the body 10.

In other words, the gyroscope 45 senses whether one portion of the body 10 is positioned in a right portion and the other portion thereof is positioned in a left portion, when the user wears the neckband 11 on the neck, or whether one portion of the body 10 is positioned in the left portion and the other portion is positioned in the right portion, when the user wears it in the reverse direction.

Alternatively, another gyroscope 45 may be provided in the earphone 31 and may sense whether the earphone 31 is falling or sense the position thereof, together with the gyroscope 45 provided in the body 10 sensing the position thereof, only to sense whether to be positioned under or beyond the body 10. When it is positioned lower than the body 10, it can be determined that the earphone 31 is not inserted in the user's ear and sounds may be controlled not to output via the earphone 31.

Rather than the gyroscope 45, a temperature sensor 47 may be provided in the unit of the earphone 31 to sense whether the earphone is coupled to the user's ear. When the temperature of the earphone reaches the body temperature, it can be determined that the earphone is coupled to the user's ear.

Even when one of the earphones 31 is separated from the earphone coupling portion 41, with the other one not separated there from in a predetermined time period, one earphone 31 can be separated to be used. In this instance, it has to be checked whether the user tries to use only the one earphone additionally.

When one of the earphones 31 is separated from the earphone coupling portion, with the other one not separated there from in a predetermined time period, the unit of the earphone 31 is positioned higher than the body 10. When the gyroscope 45 or the temperature sensor 47 senses that the earphone 41 is coupled to the user's ear, it means that the user tries to use the earphone 31 and sounds may be controlled to output via the earphone 31.

Further, the user input unit 50 is configured to input the user's command or voice. The user input unit may include a button 51 and a microphone 55. The buttons 51 may be provided in the body 10 and be configured to control a call connection when the mobile terminal receives a call, adjust a volume, and control music playing.

The buttons 51 may be provided in both sides of the body 10 having the neck band 11 wearable on the user's neck, in symmetry. At this time, when right and left portions of the neck band 11 are reversed after the user wears the neckband 11 in a wrong direction, the right and left functions can be automatically switched over.

For example, the button for call connection is positioned in one side and the button for music playing is positioned in the other side. In this instance, the functions of the buttons 51 may be switched over to always position the music playing button in the right and the call button in the left, regardless of the user's wearing the neckband in a forward or reverse direction. As mentioned above, the gyroscope 45 can sense whether the body 10 is worn in the forward direction or the reverse direction.

Further, the microphone 55 may be configured to talk on the mobile terminal or to record phone conversation and may be provided adjacent to the user's mouth. According to the embodiment of FIG. 2, the microphone 55 may be provided in one end of the body 10.

At this time, the microphone 55 may be positioned adjacent to the speaker 35. When the function of the microphone 55 is used, the speaker 35 positioned adjacent to the microphone 55 may be controlled not to operate and only the other speaker 35 positioned in opposite may be controlled to operate so as to prevent the sounds output via the speaker 35 from being input again via the microphone 55.

The battery 70 is provided in the body 10 and supplies the power to operate each of the parts composing the BLUETOOTH headset 100. A rechargeable secondary cell may be used as the battery 70 and the battery may be a detachable type or mountable type.

A vibration motor 60 may be further provided in the body 10. The vibration motor 60 may vibrate the body 10 to provide user with an alarm function. When an alarm function is implemented by an event generated in the mobile terminal, the vibration motor 60 may be operated to notify the user of the alarm without looking at the mobile terminal. The event may include receiving a call or a message.

The controller 80 may be supplied the power by the battery 70 to control each of the parts composing the BLUETOOTH headset 100. The controller 80 may transfer the audio signal received from the BLUETOOTH module 20 to the speaker 35 or the earphone 31, only to output the sounds.

When the coupling sensor 41 senses that the earphone 31 is coupled to the earphone coupling portion 15, the controller 80 may transfer the audio signal to the speaker 35. When the coupling sensor 41 senses whether the earphone 31 is not coupled to the earphone coupling portion 15, the controller 80 may transfer the audio signal to the earphone 31.

Moreover, even when the earphone 31 is separated from the earphone coupling portion 15, the gyroscope 45 or the temperature sensor 47 senses a state of the earphone 31 not coupled to the user's ear and the controller 80 then stops the audio signal transfer to the earphone 31 to control the sound not output via the earphone 31.

The controller 80 may control the BLUETOOTH module 20 to transfer a control command input via the button 51 to the mobile terminal or to transfer sound information input to the microphone 55 to the mobile terminal. When receiving an alarm signal from the mobile terminal, the controller 80 may drive the vibration motor 60.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A wireless headset, comprising:
a body having an earphone coupling portion and configured to be worn around the user's neck;
a wireless module provided in the body and configured to wirelessly receive an audio signal from a mobile terminal;
a speaker provided in the body;
an earphone configured to be worn on a user's ear and configured to be separably coupled to the earphone coupling portion;
a cable connecting the body and the earphone and transmitting the audio signal to the earphone;
a coupling sensor provided in the body and configured to sense whether the earphone is coupled to the earphone coupling portion; and
a controller configured to:
output the audio signal received from the mobile terminal via the speaker and not via the earphone, when the coupling sensor senses the earphone is coupled to the earphone coupling portion, and
output the audio signal received from the mobile terminal via the earphone and not via the speaker, when the coupling sensor senses the earphone is separated from the earphone coupling portion.

2. The wireless headset according to claim 1, wherein the speaker includes an audio hole formed adjacent to a user's ear when the user wears the headset.

3. The wireless headset according to claim 2, wherein the speaker further includes a waveguide provided in the audio hole, the waveguide having a taper shape with a cross section getting larger toward the audio hole.

4. The wireless headset according to claim 3, wherein the waveguide includes curved projections formed on an inner surface of the waveguide.

5. The wireless headset according to claim 2, wherein the body includes a C-shaped neckband, and
wherein the audio hole points upward when the user is wearing the neckband around their neck.

6. The wireless headset according to claim 5, wherein the audio hole comprises:
a first audio hole that is opened upward, when the user wears the neckband around their neck in a first position with one end of the neckband on a right side of the user and the other end of the neckband on a left side of the user;
a second audio hole that is opened upward, when the user wears the neckband around their neck in a second position with said one end of the neckband on the left side of the user and the other end of the neckband on the right side of the user; and
covers configured to open and close the first and second audio holes, respectively, and wherein the controller is further configured to open the cover of the first audio hole and close the cover of the second audio hole, when the user wears the neckband in the first position, and to open the cover of the second audio hole and close the cover of the first audio hole, when the user wears the neckband in the second position.

7. The wireless headset according to claim 6, further comprising:
a gyroscope configured to sense a direction of the neckband,
wherein the controller is further configured to open and close the covers based on the direction sensed by the gyroscope.

8. The wireless headset according to claim 5, wherein the speaker is configured to be rotated, and
wherein the controller is further configured to automatically rotate the speaker to position the audio hole to point upward based on the direction in which the user wears the neck band.

9. The wireless headset according to claim 5, further comprising:
a microphone formed in one end of the neckband,
wherein the speaker is formed in other end of the neckband.

10. The wireless headset according to claim 5, further comprising:
a microphone formed in one end of the neckband,
wherein the speaker is formed in each end of the neckband and only one speaker positioned in the other end of the neckband is operated when a sound is input via the microphone.

11. The wireless headset according to claim 1, further comprising:
a button provided in right and left portions of the body symmetrically to wireless transmit a control signal to the mobile terminal using a short range communication method to activate a specific function of the mobile terminal; and
a gyroscope configured to distinguish an upper portion from a lower position of the body,
wherein the controller is further configured to switch over functions of the left and right buttons, when the gyroscope senses that upper and lower position of the body is switched.

12. The wireless headset according to claim 1, wherein the earphone includes a temperature sensor, and
wherein the controller is further configured to output sounds via the earphone only when the temperature sensor senses a temperature higher than a reference temperature.

13. The wireless headset according to claim 1, wherein the body further comprises:
a wearable neckband; and
a gyroscope configured to sense the position of the body,
wherein the earphone includes a gyroscope configured to sense a position of the earphone, and
wherein the controller is further configured to output sounds via the earphone only when the position of the earphone is higher than the position of the body.

14. The wireless headset according to claim 1, wherein at least one of the earphone and the earphone coupling portion include a magnet to magnetically couple the earphone and the earphone coupling portion.

15. The Bluetooth headset according to claim 1, wherein the coupling sensor senses the coupling between the earphone and the earphone coupling portion by using at least one of a hall IC, a static pressure sensor, a capacity sensor and a proximity sensor.

16. A wireless headset, comprising:
a body configured to be worn around the user's neck and having a pair of earphone coupling portions;
a wireless module provided in the body and configured to wirelessly receive an audio signal from a mobile terminal;
a speaker provided in the body;
a pair of earphones configured to be worn on a user's ear and detachably coupled to the earphone coupling portions;
a pair of cables configured to connect between the body and the earphones; and
a controller configured to output the audio signal received from the mobile terminal via one of the speaker and the earphone.

17. A wireless headset, comprising:
a body configured to be worn around the user's neck and having a pair of earphone coupling portions;
a wireless module provided in the body and configured to wirelessly receive an audio signal from a mobile terminal;
a speaker provided in the body;
a pair of earphones configured to be worn on a user's ear and detachably coupled to the earphone coupling portions;
a pair of cables configured to connect between the body and the earphones; and
a controller configured to perform a designated function according to a number of the earphone coupling portions coupling the earphone.

18. The wireless headset according to claim 16, wherein the controller is further configured to output the audio signal via the speaker when one of the earphones is separated from the earphone coupling portion and the other earphone is not separated in a preset time period or both of the earphones are coupled to the earphone coupling portions.

19. The wireless headset according to claim 16, wherein the controller is further configured to transmit a control signal to the mobile terminal to activate a call function of the mobile terminal when one of the earphones is separated and the other earphone is not separated in a preset time period.

20. The wireless headset according to claim 16, wherein the controller is further configured to transmit a control signal to the mobile terminal to activate a music playing function of the mobile terminal when both of the earphones are separated from the earphone coupling portions.

* * * * *